Dec. 25, 1962 D. F. ELDRIDGE ETAL 3,070,670

MAGNETIC RECORD HEAD ASSEMBLY

Filed Feb. 23, 1960

DONALD F. ELDRIDGE &
ERIC D. DANIEL
INVENTORS

BY Nathan N. Kallman

ATTORNEY

United States Patent Office 3,070,670
Patented Dec. 25, 1962

3,070,670

MAGNETIC RECORD HEAD ASSEMBLY

Donald F. Eldridge, Palo Alto, and Eric D. Daniel, Menlo Park, Calif., assignors to Ampex Corporation, Redwood City, Calif., a corporation of California Filed Feb. 23, 1960, Ser. No. 10,347
3 Claims. (Cl. 179—100.2)

This invention relates to magnetic recording apparatus and in particular to an improved magnetic record transducing assembly.

In presently known systems which employ a magnetic record head with a single gap and a source of alternating current bias signal, there is a loss of signal information notably in the high frequency range. This occurs because the bias current is adjusted for maximum sensitivity at long wave-lengths to avoid excessive distortion at low frequencies. However, at very short wavelengths this bias current is usually excessive thereby causing erasure and extreme losses of signal at the high frequencies, especially when using slow speed recording and reproducing. The extent of these losses is determined by, among other things, the magnitude of the bias signal, the thickness of the layer of magnetic material onto which the information is recorded, and the width of the record head gap traversed by the layer of magnetic material. Such loss of signal information reduces the high fidelity performance of magnetic tape apparatus.

For a record head, the gap must be wide enough to achieve deep flux penetration into the tape for recording the long wavelengths and yet narrow enough to obtain sharp gradients of high frequency bias flux at the tape surface adjacent to the gap for effectively recording the short wavelengths or high frequency signals. To record the high frequency signals, the size of the record gap may be reduced. However, if the gap size is reduced in order to provide better resolution of high frequencies, the signals recorded at low frequencies are distorted and reduced in amplitude. The result is a deterioration in dynamic range of signal-to-noise ratio.

An object of this invention is to provide an improved magnetic record head assembly which results in optimum recording and reproducing of signal information.

Another object of this invention is to provide magnetic recording apparatus with improved performance for an extended wavelength spectrum.

Another object is to provide magnetic recording apparatus having an improved signal-to-noise ratio.

According to the invention, a magnetic record head assembly comprises a plurality of gaps, means for applying independent magnetic fields to each gap, and means for applying selected regions of the wavelength spectrum of the information signal to be recorded to selected gaps.

According to one embodiment of the invention, an integral magnetic record head or transducer has a plurality of discrete gap portions formed therein. A plurality of alternating current bias signals are separately and simultaneously applied to these gap portions. Signal information which is received is selectively separated and directed to each portion of the record head so that the separated components of the signal are added to the separate bias signal applied to a gap portion.

In another embodiment of this invention, a magnetic tape apparatus utilizes separate record heads each having recording gaps of different size. Separate bias currents are applied simultaneously to each record head. Signal information to be recorded is selectively divided into components having different wavelength spectra and the components are directed to selected record heads adapted to record this particular range of wavelength most efficiently. Since an actual time difference exists in recording each range of separated signals, which results from the spacing of the record heads along the path of motion of the recording medium or magnetic tape, a time delay between the separated signals which are supplied to the record heads is effected to negate the time differential.

The invention will be described in greater detail with reference to the drawing in which.

Figure 1:
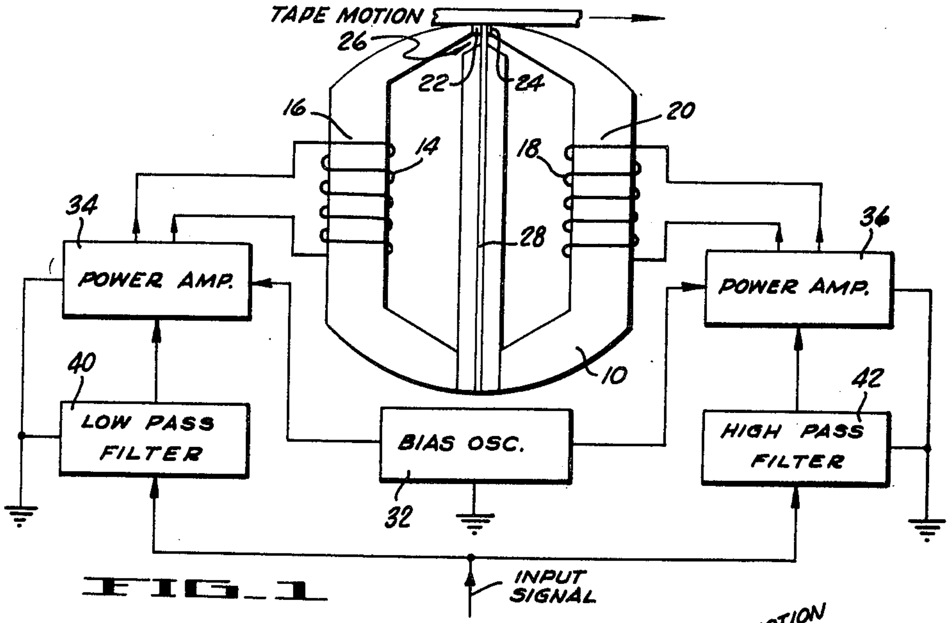
FIGURE 1 is a schematic view, partially in block form, of an integral magnetic record head assembly and associated circuit, in accordance with one embodiment of the invention.
Figures 2, 3:
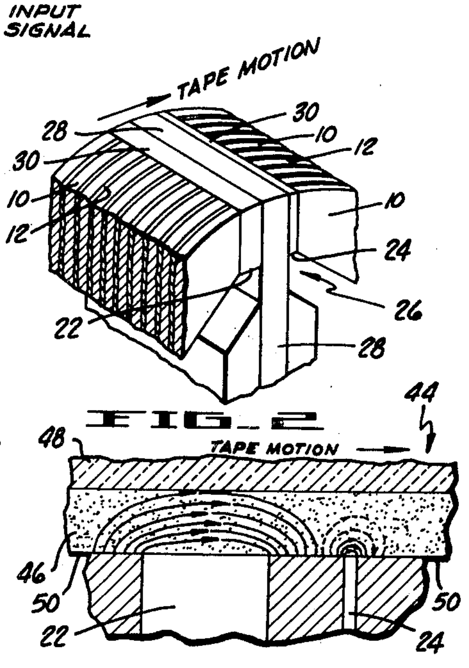
FIGURE 2 is a perspective sectional view of the upper portion of the magnetic record head illustrated in FIGURE 1.
FIGURE 3 is an enlarged partial view of discrete gap portions of the magnetic record head of FIGURE 1 and a magnetic tape showing the flux lines at each gap for the purpose of illustration.

As shown in FIGURES 1 and 2, a magnetic core is formed from a stack of substantially identical thin laminations 10 which are made from magnetizable ferromagnetic material, such as Permalloy for example. Interspersed between each of the thin magnetizable laminations 10 are electrically insulating spacers 12 shaped similarly to the laminations 10, which may be generally annular in form. A coil 14 is wound on a leg 16 of the core, and a second coil 18 is coupled to a second leg 20 of the core.

In accordance with one embodiment of this invention, two gaps 22 and 24 of different size are formed at a narrow section 26 of the core. This may be achieved by inserting a thin sheet 28 of magnetizable material, which may also be Permalloy, transversely within the core thereby intersecting the section 26. Within each of the gaps 22 and 24 and interposed between the upper portions of legs 16 and 20 and a portion of each side of the sheet 28 is a strip 30 of nonmagnetizable material, such as copper or platinum for example, which is disposed co-extensively with the sheet 28 through the stack of laminations 10. Alternatively, the gaps 22 and 24 may be air gaps, or may contain any other nonmagnetic material having a permeability substantially that of air.

A bias oscillator 32 provides bias current to each of the coils 14 and 18 through power amplifiers 34 and 36 respectively. The value of bias current applied to each coil is determined in accordance with the size of the corresponding gap, and the spacing between the gaps, inter alia. An input signal 38 is added to the bias current signal through a low pass filter 40 and a high pass filter 42 which are coupled to amplifiers 34 and 36 respectively. The long wavelength signals of the input signal 38 are sensed by the large gap 22 associated with leg 16, and conversely the short wavelength signals are sensed by the small gap 24 associated with leg 20.

In operation, a recording medium or magnetic tape is moved longitudinally past the gaps 22 and 24, and is magnetized in accordance with the magnitude of the field adjacent to each gap. The gaps are spaced very closely at .006 inch for example, so that the long wavelength and short wavelength portions of any given signal are recorded practically at about the same time. The tape picks up the long wavelength signals at the large gap 22, and then as it moves past the small gap 24 picks up the short wavelength signals without any appreciable erasure of the practically simultaneously recorded long wavelength signals. Any delay during the recording of the long wavelength and short wavelength signal information is so minute that a listener would not detect any differentiation in the audible sound reproduction.

The magnitude of the bias signal applied to coil 14 is such that optimum response to long wavelength signals is provided by virtue of the discrete relatively large gap 22. Similarly the response of the record head to short wavelength signals is greatly enhanced by the application of a separate bias signal which controls the magnetic flux in the area of the small gap 24. Thus the gap 24 is made to be especially adapted to respond to a high frequency signal band without loss of signal information. Furthermore, the predetermined bias currents are of such value that the magnetic flux appearing at any one gap does not appreciably affect the information signal directed to the other gap. Therefore, the effects of erasure and resultant loss of signal which may occur with excessive or superimposed magnetic fields are substantially eliminated by means of the invention.

In FIGURE 3, an enlarged view of part of the narrow section includes gaps 22 and 24 which are shown adjacent to a magnetic tape 44. The tape 44 may be of the conventional type and may comprise a magnetic layer 46, such as gamma ferric oxide, which is deposited on a Mylar base 48, by way of example. The magnetic field associated with each gap penetrates the layer 46 in proportion to the length of the gap, and the fields near each gap are varied in accordance with the information signal being recorded. It is noted that the magnetic field which is developed at the large gap 22 allows the magnetic flux lines to penetrate deeply into the layer 46 with sufficient intensity. In contradistinction, the fluid field at the small gap 24 is concentrated at the surface 50 of the tape 44 which is closest to the gaps, and the intensity of this field diminishes rapidly as it progresses into the layer 46. The high intensity field developed at the gap 24 adjacent to the tape surface 50 does not appreciably affect the long wavelength signals which are recorded through the depth of the magnetic layer 46. Thus the large gap 22 in combination with the bias current that is applied to the leg 16 can efficiently process the long wavelength portion of the information signal, and the gap 24 in conjunction with the bias applied to leg 20 can effectively register the short wavelength or high frequency portion of the information signal. It is understood that the complete information signal may be defined by the long and short wavelength portions, and that a continuous wavelength spectrum may be represented thereby.

Figure 4:
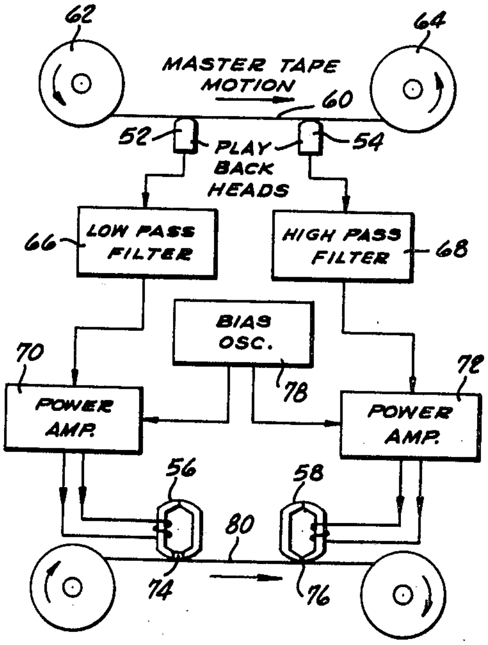
FIGURE 4 is a schematic diagram of another embodiment of the invention incorporating separate magnetic record heads in a magnetic record duplicating apparatus.

In FIGURE 4, another embodiment of the invention is shown which utilizes two separate reproduce heads 52 and 54 in conjunction with two separate record heads 56 and 58 for improving the wavelength or frequency response characteristic in a duplicating record system. A master tape 60 carrying signal information is fed from a supply reel 62 to a take-up reel 64. The reproduce heads 52 and 54, which may be of the conventional type, pick up the information signal with a delay in time which depends upon the spacing of the heads 52 and 54 and the speed of the tape 60. The signal from each head is directed respectively through a low pass filter 66 and high pass filter 68 and then through amplifiers 70 and 72 to the record heads 56 and 58. The record head 56 has a relatively large gap 74 adapted for operating efficiently with the long wavelength signals, whereas the head 58 has a much smaller gap 76 for efficiently processing the short wavelength signals during recording. A separate bias current is supplied to each of the record heads 56 and 58 from a bias source 78 through the amplifiers 70 and 72 which are coupled to coils wound around a portion of each head 56 and 58.

A recording tape 80 records the information represented at each of the gaps 74 and 76. If the speed of the recording tape 80 is the same as that of the master tape 60, the record heads 56 and 58 are spaced along the path of tape motion at approximately the same distance as the reproduce heads 52 and 54. However, if the tapes 60 and 80 travel at different speeds, the spacings between the pairs of heads 52, 54 and 56, 58 may be adjusted accordingly so that the actual delay which occurs during reproduction is balanced by the same delay in the recording stage.

According to the invention, a magnetic record head having a predetermined gap area and a predetermined bias signal applied thereto may be utilized to provide a very high degree of response to a given signal range. The apparatus of this invention especially affords an increased output for the short wavelength, high frequency signals with a noticeable improvement in the signal-to-noise ratio.

A relatively large gap portion affords improved and faithful recordation of the long wavelength signals, and on the other hand, a smaller gap provides for improved recordation of the short wavelength signals. Thus a broad range of high and low frequency signal information is recorded with a minimum loss of signal.

For the purpose of example, an arrangement of the device shown in FIGURE 1 may employ a tape having a magnetic layer of about .0005 inch in depth, a large gap of approximately .001 inch, and a smaller gap of about .0001 inch with the gaps spaced at about .006 inch from center to center. A tape speed of 1⅞ inches per second may be employed, for example, and a time delay of about three milliseconds would result when utilizing the dimensions specified herein. Thus it is seen that the proximity of the gaps is such that there would be practically no audible perception of the delay when reproducing the different ranges of signals.

It is understood that the invention is not limited to the specific examples described above. For instance, one modification may include the addition of a third coil and bias source which may be coupled to the magnetizable sheet 28 that is interposed between the two legs 16 and 20 of the integral magnetic record head illustrated in FIGURES 1 and 2. This third coil could control any interaction which may occur between the legs 16 and 20.

In another modification, the magnetic record head may be formed of a ferrite core instead of laminated Permalloy. In general, any magnetic material which can provide a magnetic field that can be varied in accordance with signal information may be used. In addition, a series of gaps, and means for applying a separate flux field to each gap may be combined in a record head assembly.

Also, in the apparatus shown in FIGURE 4, one reproduce head may be utilized instead of the two heads illustrated therein. However, in such event, a suitable delay line would be required to provide the same delay that occurs during the recording process with the spaced records heads 56 and 58.

It is noted that the scope of the invention is applicable to magnetic tape systems employing various tape speeds and is particularly applicable when slow speed magnetic tapes are utilized in audio recording. Also, a multiple track tape may be used to record different frequency signal ranges simultaneously.

There has been described a new and useful magnetic record head assembly in which the signal to be recorded is subjected to a frequency sensitive means to separate the signal into components having a selected wavelength spectrum, and thereafter each component is applied to a gap of such width in a record head assembly which is so biased as to most efficiently record the wavelength spectrum component applied thereto.

What is claimed is:

1. A magnetic record duplicating system comprising: means for moving a master tape carrying signal information consisting of high frequency and low frequency components; a first reproduce head; a second reproduce head spaced from said first reproduce head along the path of motion of said master tape, each reproduce head disposed adjacent to said master tape for picking up said signal information from said tape; a low pass filter means for passing said low frequency components to a separate channel coupled to said first reproduce head; a high pass filter means for passing said high frequency components to another signal channel coupled to said second reproduce head; means for recording signal information; a first record head having a wide gap therein; a second record head having a narrow gap therein, said gaps being spaced at substantially the same distance as said first and second reproduce heads, said gaps extending parallel to each other and adjacent to said recording means; a source of bias signals for application of bias current to each of said record heads; and means coupling said record heads to said bias source and to said filter means.

2. A magnetic recording system comprising: a source of information signal, delay means for providing duplications of said information signal at spaced intervals of time; a plurality of filter means coupled to said delay means for passing predetermined wavelength spectra of said information signal at said spaced intervals; a source of bias signals; and a plurality of record heads coupled to said filter means and to said bias signal source, each of said heads having a gap of different width for recording selectively one of said wavelength spectra, and spaced for providing delays between recording each of said spectra corresponding to said spaced intervals.

3. A magnetic recording system for recording signal information onto a moving magnetic recording tape comprising: a first magnetic record head; a second magnetic record head, each of said heads having a nonmagnetic gap disposed along the path of motion of said tape; biasing means for applying bias signals to said heads to establish substantially independent and different flux fields at said gaps; a source of information signal including means for providing a duplication of said information signal, said duplicated signal having a delay with relation to said information signal; a first wave filter for passing a first signal comprising a predetermined wavelength region of said information signal coupled to said source of information signal; a second wave filter for passing a second signal comprising a predetermined wavelength region of said delayed and duplicated information signal coupled to said duplicating signal means; means coupled to said first wave filter for applying said first signal to said first record head; and means coupled to said second wave filter for applying said second signal to said second record head, said heads being very closely spaced for providing a delay in recording said first and second signals substantially the same as said delay provided between said information signal and said duplicating signal so that said tape records a substantially faithful reproduction of said information signal.

References Cited in the file of this patent

UNITED STATES PATENTS

| | | |
|---|---|---|
| 2,144,844 | Hickman | Jan. 24, 1939 |
| 2,251,300 | Star | Aug. 5, 1941 |
| 2,272,821 | Roys | Feb. 10, 1942 |
| 2,532,917 | Howell | Dec. 5, 1950 |
| 2,536,810 | Holmes | Jan. 2, 1951 |
| 2,685,618 | Rettinger | Aug. 3, 1954 |
| 2,786,897 | Schwarz | Mar. 26, 1957 |
| 2,803,708 | Camras | Aug. 20, 1957 |
| 2,840,639 | Graham | June 24, 1958 |
| 3,032,612 | Goldmark | May 1, 1962 |

FOREIGN PATENTS

| | | |
|---|---|---|
| 775,050 | Great Britain | May 15, 1957 |

OTHER REFERENCES

Magnetic Sound Recording, Snel; 1959; Phillips Technical Library; available in P.O. Scientific Library (TK 5981S5).